O. J. HENNEBAUL.
BICYCLE.
APPLICATION FILED JAN. 8, 1920.
1,374,078.
Patented Apr. 5, 1921.
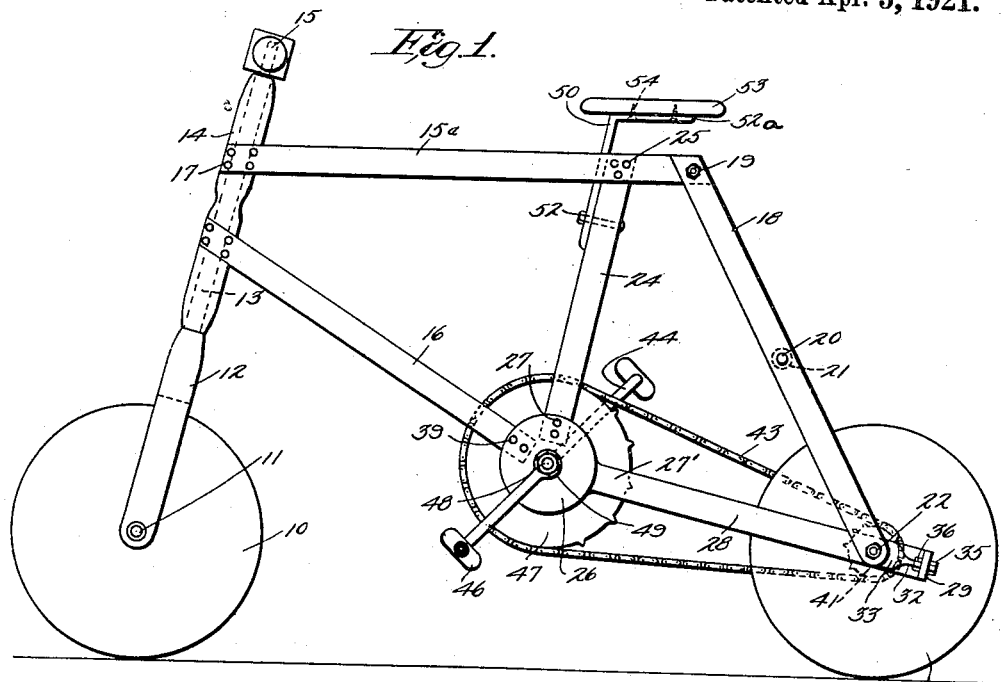
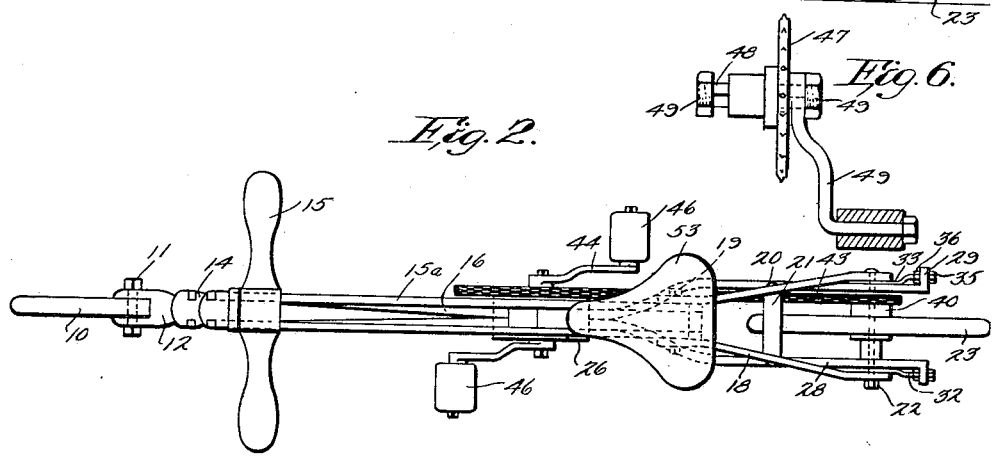
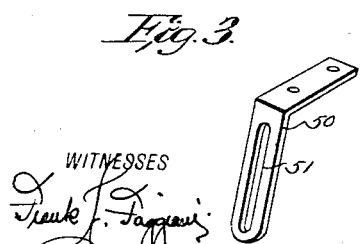
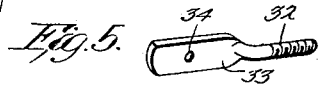
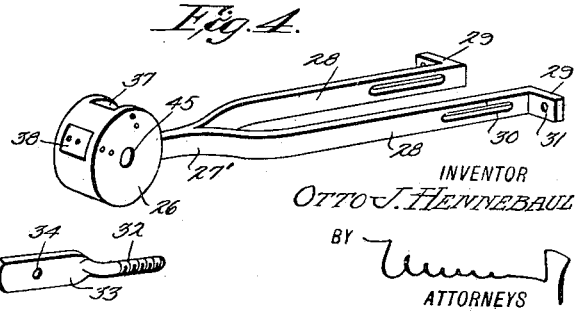
WITNESSES
INVENTOR
Otto J. Hennebaul
BY
ATTORNEYS

UNITED STATES PATENT OFFICE.

OTTO J. HENNEBAUL, OF NEW YORK, N. Y.

BICYCLE.

1,374,078.   Specification of Letters Patent.   Patented Apr. 5, 1921.

Application filed January 8, 1920. Serial No. 350,128.

*To all whom it may concern:*

Be it known that I, OTTO J. HENNEBAUL, a citizen of the United States, resident of the city of New York, borough of Manhattan, county and State of New York, have invented a new and Improved Bicycle, of which the following is a full, clear, and exact description.

This invention relates to bicycles, and has for an object to provide a bicycle of simple and inexpensive construction so that said bicycle may be produced for a minimum cost.

Another object of this invention is to provide a bicycle which is especially adapted for use by boys.

Reference is to be had to the accompanying drawing forming a part of this specification, in which it is understood that the drawing is merely illustrative of one example of the invention, and in which—

Figure 1 is a side view of the bicycle.

Fig. 2 is a top view of said bicycle.

Fig. 3 is a perspective view of the said bicycle.

Fig. 4 is a perspective view of the crank hanger and rear lower brace.

Fig. 5 is a perspective view of the chain tightener.

Fig. 6 is an elevation of the sprocket and crank detached from the frame.

Referring to the accompanying drawing by numerals, 10 indicates the front wheel of a bicycle which is rotatably mounted by means of the axle 11 on a front fork 12, said front fork having a steering post 13 journaled in a steering head 14. At the top of the steering post 13, handle bars 15 are secured at right angles thereto, said handle bars being arranged to turn the steering post 13 when it is desired to change the direction and motion of the front wheel 10. An upper split brace 15$^a$ and a lower split brace 16 are fixed to the steering head 14 by means of any suitable fasteners such as rivets 17. A rear upper brace 18 is joined to the rear of the upper brace 15$^a$ by means of a bolt 19, said rear upper brace being composed of two rods which are joined together midway the ends by means of a bolt 20, and a collar 21 surrounding said bolt. The lower ends of the rear upper brace 18 are spread apart so that a rear axle 22 may be supported thereby, and said axle 22 is adapted to rotatably support a rear wheel 23. A center brace 24 is fixed to the upper brace 15$^a$ adjacent the bolt 19 by means of fasteners such as rivets 25, and the lower end of said center brace is fixed to a crank hanger 26 by means of rivets 27. The crank hanger 26 is preferably formed integral with a rear lower brace 27′ which is forked to provide a pair of arms 28, each of which has an outstanding flange 29 on the end opposite the crank hanger 26. Each of the arms 28 is provided with a slot 30 through which the axle 22 passes, said slot serving to allow adjustment of the rear axle relative to the crank hanger 26. Each of the outstanding flanges 29 is provided with a hole 31 through which passes a bolt 32, said bolt having a flat portion 33 which is provided with a hole 34 adapted to receive the axle 22. An outer nut 35 and an inner nut 36 engage the threads on the bolt 32, and serve to secure said bolt to said outstanding flange 29. These bolts 32 when adjusted by the nuts 35 and 36 serve to secure the axle in any desired position in the slots 30 relative to the crank hanger 26. The crank hanger 26 is preferably circular in shape, and is provided with a pair of diametrical recesses 37 and 38, recess 37 being adapted to receive the lower end of the center brace 24, and the recess 38 being adapted to receive the lower end of the lower brace 16, said lower brace being fixed to said crank hanger 26 by means of rivets 39. The hub 40 of the rear wheel 23 has a drive sprocket 41 fixed thereto, said sprocket being adapted to engage a chain 43. A pedal crank 44 is journaled in a hole 45 and in the crank hanger 26, said crank hanger being provided on its ends with pedals 46 which may be operated by the rider's feet. A sprocket 47 is fixed to a shaft 48, said shaft being preferably polygonal in shape and being fixed to the cranks 44 by means of nuts 49. The sprocket 47 engages the chain 43 so that when the pedals 46 are rotated by the rider's feet, the chain 43 will drive the rear wheel 23 thus propelling the bicycle forward. A saddle post 50 is provided with a slot 51 which engages a bolt 52 passing through the center brace 24, said slot being arranged to allow vertical adjustment of the saddle post 50. The saddle post 50 has a flange 52$^a$ which is fixed to a saddle 53 by any suitable means such as screws 54.

The steering head 14, lower brace 16, upper brace 15$^a$, center brace 24, handle bars 15, wheels 10 and 23, and saddle 53 are all preferably made of wood so as to be easily replaceable in case of breakage and very cheap to construct. The balance of the device is preferably made of metal to give added strength.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention, I claim as new and desire to secure by Letters Patent:

A frame for bicycles comprising a head, a wheel supporting fork rotatably mounted in said head, a frame member projecting rearwardly from said head in a horizontal plane and rigidly attached thereto, a second frame member projecting rearwardly and downwardly from said head and rigidly attached at its forward end to the head, a crank-hanging element, a brace depending from the rearwardly constructed horizontal frame member, said rearwardly and downwardly extending frame member and said depending brace forming the support for the crank hanging element, a forked frame extending rearwardly from the crank hanging element and having elongated slots to provide for the mounting of a rear wheel, and a downwardly projected brace extending from the rear end of the horizontal frame member to a point adjacent the rear end of the forked frame member, each of said first and second mentioned frame members comprising two elements arranged in spaced parallel relation.

OTTO J. HENNEBAUL.